UNITED STATES PATENT OFFICE.

CHARLES FRICKE, OF MOBILE, ALABAMA.

IMPROVED CEMENT.

Specification forming part of Letters Patent No. 28,464, dated May 29, 1860.

*To all whom it may concern:*

Be it known that I, CHARLES FRICKE, of the city and county of Mobile, and State of Alabama, have invented a new and useful Water-Proof Composition or Mortar-Cement for Laying Brick, Stone, &c.; and I do hereby declare that the ingredients used in making said water-proof composition and the process of mixing them to make it are described in the following specification, with directions for using the same.

The nature of the water-proof composition which I have invented or discovered consists in mixing in proper proportions clean dry sand, hydraulic cement, and tar, so as to make a mortar suitable to lay brick or stone.

To enable others skilled in the art to make and use said water-proof composition or mortar-cement, I will proceed to describe the best mode known to me of mixing and using it.

Take equal quantities, by measure, of coarse clean sharp sand, hydraulic cement, and tar, mix the sand and cement together in a dry state by stirring them thoroughly, then boil the tar until the red scum ceases to rise on the surface, then stir in the mixture of sand and cement, and the composition is ready for use to lay brick or stone. This composition must be applied to the brick or stone while hot, and the brick or stone laid in their proper places while the composition is soft, and when it cools the structure will be permanent and water-proof, so far as the composition or mortar-cement is concerned.

This composition is admirably suited for making cisterns, tombs, cellars, ground floors, and other works or structures which are subject to wet and are required to either hold or resist water.

I believe I have described the water-proof composition or mortar-cement which I have invented or discovered so as to enable any person skilled in the art to make and use it. I will now state what I desire to secure by Letters Patent, to wit:

I claim as my invention or discovery—

The above-described water-proof composition or mortar-cement for laying brick, stone, &c., compounded substantially as described.

CHARLES FRICKE.

Witnesses:
   I. DENNIS, Jr.,
   EDM. F. BROWN.